(12) United States Patent
Hollingsworth

(10) Patent No.: US 7,176,450 B2
(45) Date of Patent: Feb. 13, 2007

(54) LONG TRAVEL NEAR-FIELD SCANNING OPTICAL MICROSCOPE

(75) Inventor: Russell E. Hollingsworth, Arvada, CO (US)

(73) Assignee: ITN Energy Systems, Inc., Littleton, CO (US)

(*) Notice: Subject to any disclaimer, the term of this patent is extended or adjusted under 35 U.S.C. 154(b) by 24 days.

(21) Appl. No.: 11/028,074

(22) Filed: Jan. 3, 2005

(65) Prior Publication Data

US 2005/0189480 A1 Sep. 1, 2005

Related U.S. Application Data

(60) Provisional application No. 60/534,027, filed on Jan. 2, 2004, provisional application No. 60/550,618, filed on Mar. 4, 2004.

(51) Int. Cl.
*H01J 3/14* (2006.01)
*H01J 5/16* (2006.01)
*H01J 40/14* (2006.01)
*G01N 23/00* (2006.01)
*G21K 7/00* (2006.01)

(52) U.S. Cl. ............................ 250/234; 250/306
(58) Field of Classification Search ........ 250/234–236, 250/306–311; 356/399–401; 355/53; 359/368, 359/391–393; 977/DIG. 1, 849–851, 860–862
See application file for complete search history.

(56) References Cited

U.S. PATENT DOCUMENTS

| | | | | |
|---|---|---|---|---|
| 4,979,223 A | * | 12/1990 | Manns et al. | 382/149 |
| 5,508,517 A | * | 4/1996 | Onuki et al. | 250/306 |
| 6,046,972 A | * | 4/2000 | Kuroda et al. | 369/126 |
| 6,075,613 A | * | 6/2000 | Schermer et al. | 356/446 |
| 6,201,226 B1 | * | 3/2001 | Shimada et al. | 250/201.3 |
| 6,229,607 B1 | * | 5/2001 | Shirai et al. | 356/614 |
| 6,339,217 B1 | * | 1/2002 | Kley | 250/216 |
| 2003/0062463 A1 | * | 4/2003 | Narita et al. | 250/201.3 |

* cited by examiner

*Primary Examiner*—Stephone B. Allen
*Assistant Examiner*—Suezu Ellis
(74) *Attorney, Agent, or Firm*—Lathrop & Gage LC

(57) ABSTRACT

A near-field scanning optical microscope system exposes photoresist on a substrate. The system includes an NSOM probe, and translational stages capable of moving one of the probe and the substrate such that the probe traverses, in continuous motion, over the entire substrate. Another near-field scanning optical microscope system exposes photoresist on a substrate using an array of NSOM probes. Methods for exposing photoresist on a substrate include the steps of translating a surface of the substrate across an NSOM probe (or an array of NSOM probes) in continuous motion.

32 Claims, 6 Drawing Sheets

LONG TRAVEL NEAR-FIELD SCANNING OPTICAL MICROSCOPE

CROSS-REFERENCE TO RELATED APPLICATIONS

This application claims the benefit of priority to U.S. Provisional Patent Application Nos. 60/534,027, filed 2 Jan. 2004, and 60/550,618, filed Mar. 4, 2004; both of these applications are incorporated herein by reference.

BACKGROUND

Near-field scanning optical microscopes ("NSOMs") operate by scanning an optical probe ("probe") over a sample. Depending on the mode of operation of an NSOM, the probe may illuminate or collect light, or both. The probe passes light through an aperture smaller than the wavelength of the light. The probe and/or sample are scanned such that the aperture passes over the area to be imaged. An image so constructed occurs on a line-by-line or point-by-point basis. Typical NSOMs use piezoelectric transducers to perform the scanning motions. The spatial resolution achievable by an NSOM is not limited by the wavelength of the light, as in standard microscopy, but rather by the dimension of the aperture through which the light passes (i.e., a smaller aperture produces a higher resolution image) and by the spacing of the points or lines that make up the image.

An NSOM may also act as a light source to produce subwavelength images in photoresist. A substrate is coated with photoresist and placed on an NSOM stage. The NSOM probe and/or the substrate are scanned to move the probe's aperture over an area of photoresist to be imaged, to expose the photoresist line-by-line or point-by-point. Photoresist image resolution depends upon the dimension of the aperture and on the spacing of the points or lines during scan.

Existing electron beam tools for direct writing exposure of photoresist on a substrate expose the substrate to vacuum conditions and high energy electrons. Imaging of surface features (i.e., alignment features) in electron beam tools also unavoidably exposes photoresist over such features. Images produced by existing conventional lithography tools such as mask projection or contact aligners expose entire regions simultaneously through photomasks. The images produced by conventional lithography tools are also subject to the effects of diffraction.

SUMMARY

A near-field scanning optical microscope system exposes photoresist on a substrate. The system includes an NSOM probe, and translational stages capable of moving one of the probe and the substrate such that the probe traverses, in continuous motion, over the entire substrate. Another near-field scanning optical microscope system exposes photoresist on a substrate using an array of NSOM probes. Methods for exposing photoresist on a substrate include the steps of translating a surface of the substrate across an NSOM probe (or an array of NSOM probes) in continuous motion.

DETAILED DESCRIPTION OF DRAWINGS

Figure 1:
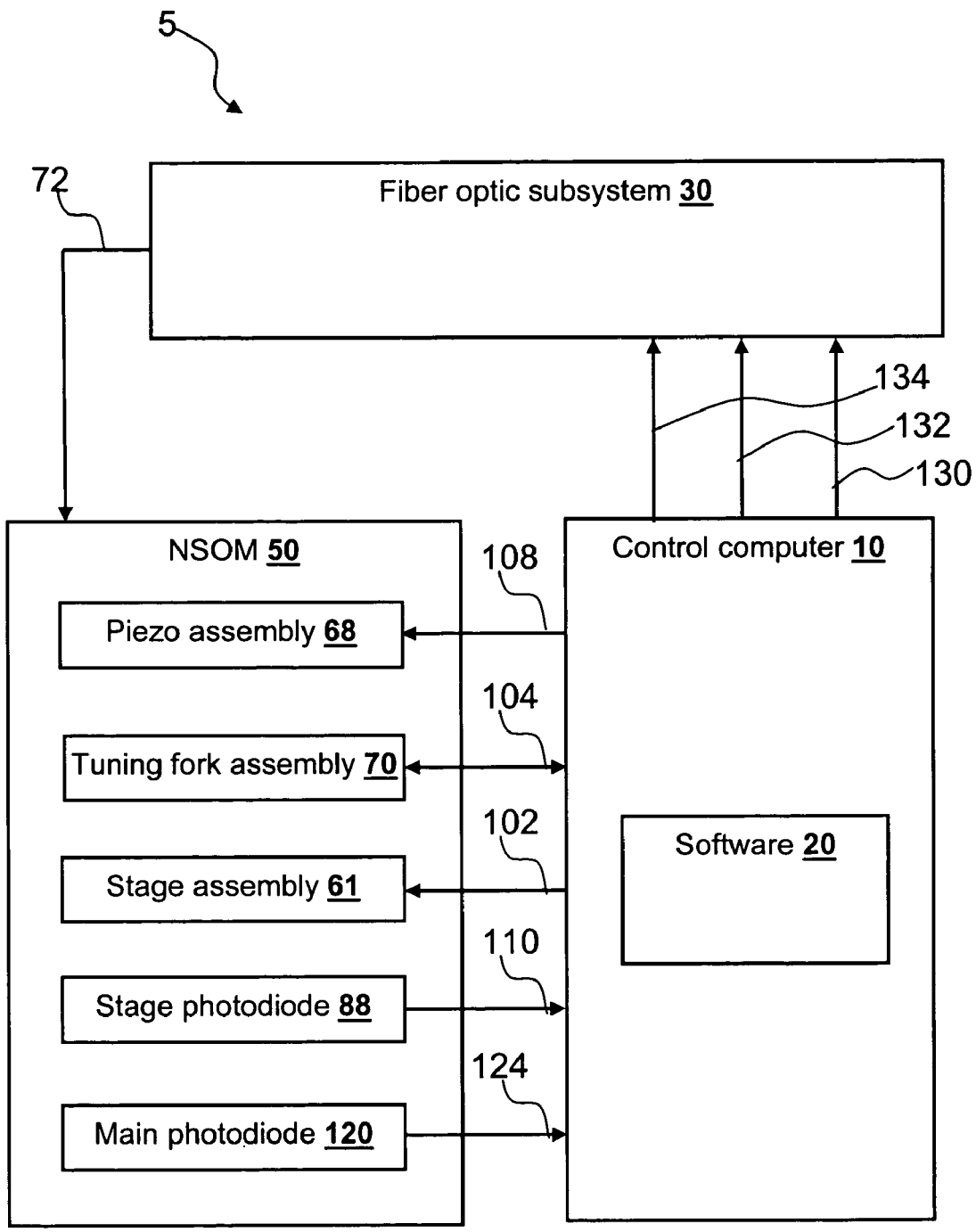
FIG. 1 shows a block diagram of an NSOM lithography system in an illustrative embodiment.

FIG. 1 shows an embodiment of an NSOM lithography system 5, which has a control computer 10, a fiber optic subsystem 30, and an NSOM 50. Control computer 10 is configured by software 20 to perform various tasks as described herein. Control computer 10 and fiber optic subsystem 30 interface through a shutter control line 130, an ultraviolet ("UV") laser power control line 132, and a red laser power control line 134. Fiber optic subsystem 30 generates light, transmitted by optical fiber 72 to NSOM 50. Control computer 10 also interfaces with certain components of NSOM 50 as follows: a piezoelectric ("piezo") assembly 68, through piezo control line 108; a tuning fork assembly 70, through tuning fork line 104; a stage assembly 61, through stage control line 102; a stage photodiode 88, through stage photodiode output line 110; and a main photodiode 120, through main photodiode output line 124. As used herein, "line" may comprise multiple lines or buses as a matter of design choice. NSOM 50 may also include other components as described below.

Figure 2:
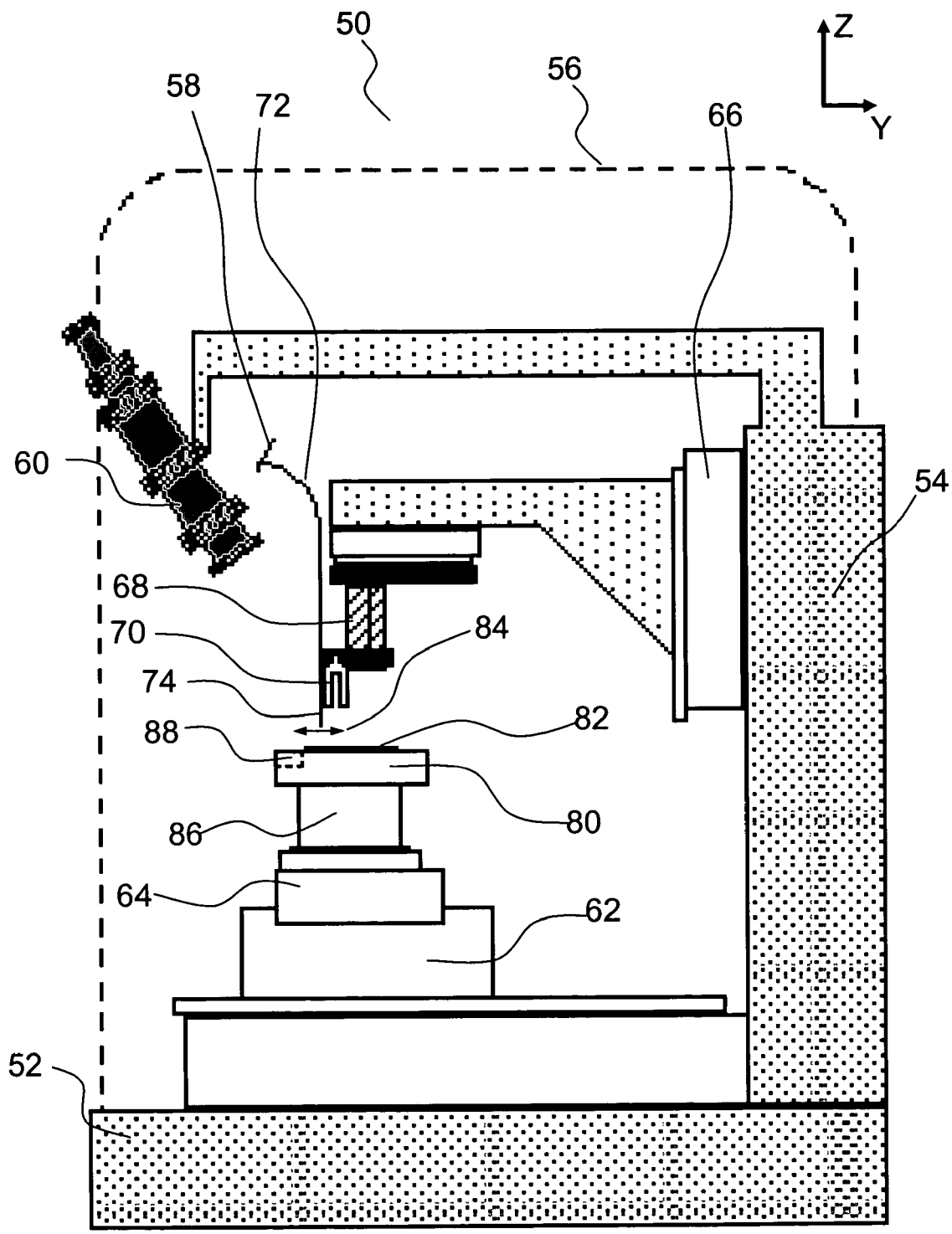
FIG. 2 shows a side view of one NSOM.

FIG. 2 shows a side view of NSOM 50. Certain features of FIG. 2 have been exaggerated for clarity and are not drawn to scale. NSOM 50 includes a base 52, a support member 54, and an enclosure 56. A Y translation stage 62 mounts with base 52; an X translation stage 64 mounts with Y translation stage 62. A rotational stage 86 mounts with X translation stage 64. A substrate holder 80 mounts with rotational stage 86; a stage photodiode 88 is integrated with substrate holder 80. A substrate 82 is placed on substrate holder 80. A Z translation stage 66 mounts with support member 54. Piezo assembly 68 mounts with Z translation stage 66. Tuning fork assembly 70 mounts with piezo assembly 68. Optical fiber 72 mounts with one side of tuning fork assembly 70. An end of optical fiber 72 passes through opening 58 in enclosure 56, to connect with fiber optic subsystem 30, FIG. 1. Another end of optical fiber 72, just below the point at which optical fiber 72 mounts with tuning fork assembly 70, is part of optical probe 74. Through microscope 60, mounted with support member 54, a user may view an area of substrate 82 adjacent to optical probe 74.

Figure 3:
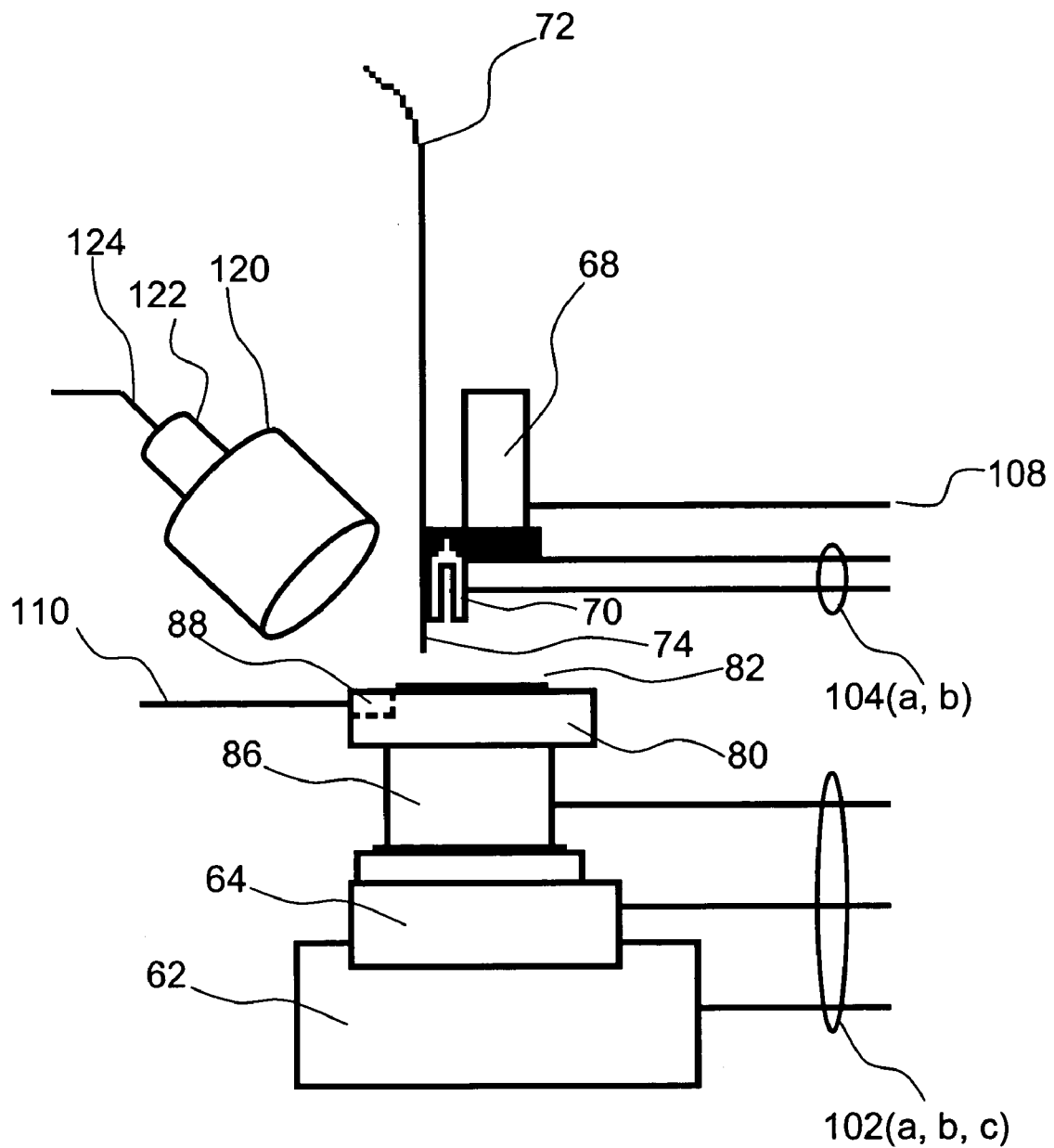
FIG. 3 shows exemplary detail of one NSOM.

FIG. 3 shows exemplary detail of NSOM 50. Each of X translation stage 64 and Y translation stage 62 is, for example, a high precision, long travel, granite air bearing stage, (e.g., a granite air bearing stage capable of 2 nm step sizes over 300 mm travel in its axis of motion). Rotational stage 86 is, for example, a rotary stage with 0.0001 degree resolution. Y translation stage 62, X translation stage 64, and rotational stage 86 are shown connected with stage control lines 102(a, b, c) respectively. Tuning fork assembly 70 is shown connected with tuning fork control line 104(a) and tuning fork measurement line 104(b). Piezo assembly 68 is shown connected with piezo control line 108; a voltage supplied by piezo control line 108 to piezo member 68 controls the length of piezo member 68, to control separation between optical probe 74 and sample 82.

Light entering stage photodiode 88 generates an electrical current that is sent into stage photodiode output line 110; the electrical current is proportional to the intensity of the light. Stage photodiode 88 thus enables calibration of light intensity emitted from optical probe 74, and enables transmission imaging of small samples. Collection optics 120 operate to collect light from substrate 82 and to focus the collected light into main photodiode 122, which in turn connects with main photodiode output line 124.

Figure 4:
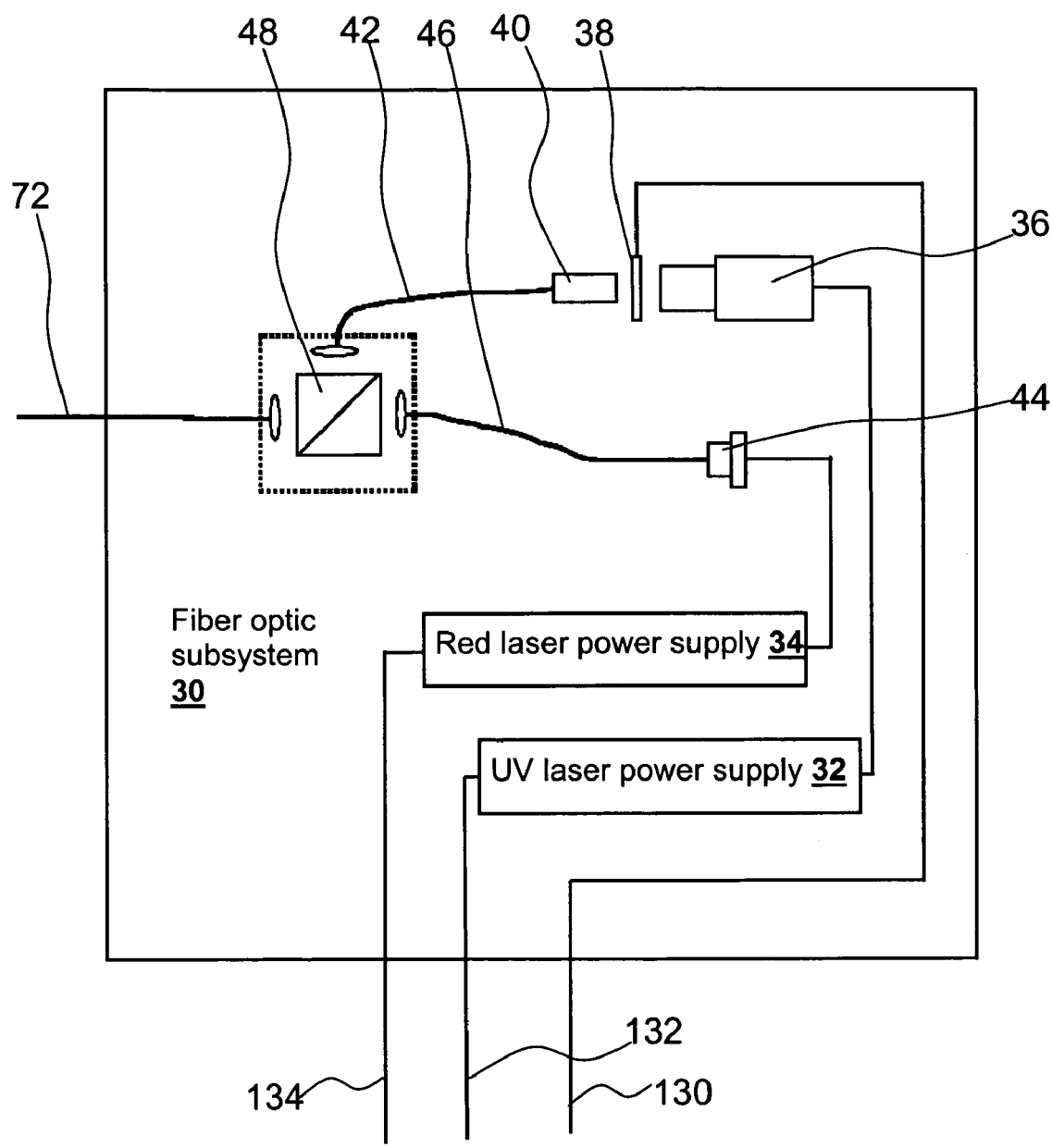
FIG. 4 shows exemplary detail of one fiber optic subsystem.

FIG. 4 shows exemplary detail of fiber optic subsystem 30. UV laser power supply 32 adjusts electrical power supplied to UV laser 36, in response to signals from control computer 10 on UV laser power control line 132. UV laser 36 emits UV light (with light intensity proportional to the electrical power supplied) towards shutter 38. Shutter control line 130 operates shutter 38 to block or alternatively transmit UV light into coupling optics 40. When shutter 38 is open, coupling optics 40 collect UV light into fiber 42. Red laser power supply 34 adjusts electrical power supplied to red laser 44, in response to signals from control computer 10 on red laser power control line 134. Red laser 44 emits red light (with light intensity proportional to the electrical power supplied) into fiber 46. Fiber 42 and fiber 46 connect with a dichroic fiber combiner 48, which combines the UV and red light into optical fiber 72.

NSOM lithography system 5 may operate as an imaging tool, a photoresist exposure tool, or both. When NSOM lithography system 5 operates as an imaging tool, control computer 10 (as configured by software 20) sends a signal through tuning fork control line 104(*a*) to tuning fork assembly 70, causing tuning fork assembly 70 to dither optical probe 74 in the Y direction (i.e., in the direction of arrow 84 of FIG. 2), adjacent to a surface of substrate 82. Tuning fork assembly 70 returns an oscillation amplitude measurement through tuning fork measurement line 104(*b*) to control computer 10. A measured oscillation amplitude indicates a shear-force interaction between probe 74 and substrate 82, with a dampened oscillation amplitude indicating proximity of probe 74 to substrate 82. Control computer 10 uses the oscillation amplitude measurement to adjust a voltage supplied to piezo member 68, in order to maintain a constant probe-to-substrate separation.

Referring to FIG. 3, light entering optical fiber 72 passes into optical probe 74; a portion of the light is emitted through a subwavelength aperture in optical probe 74 towards substrate 82. In one example of generating image data, collection optics 120 collect reflected light from sample 82 and focus the reflected light into main photodiode 122, which sends an electrical current (proportional to the reflected light) into main photodiode output line 124. Control computer 10 receives the electrical current from main photodiode output line 124 and converts it to digital data. In another example of generating image data, stage photodiode 88 may collect light transmitted through sample 82 and send an electrical current (proportional to the transmitted light) into stage photodiode output line 110. Control computer 10 receives the electrical current from stage photodiode output line 110 and converts it to digital data.

Control computer 10 moves substrate 82 in a raster scan under optical probe 74 by generating and sending signals through stage control lines 102(*a, b, c*) to stages 62, 64, and 86, respectively. The distance traveled by substrate 82, from one point to the next in the raster scan, is less than the wavelength of light emitted through optical probe 74. Simultaneously, control computer 10 enables and/or controls (1) the determination and adjustment of probe-to-substrate separation, (2) light emission through optical probe 74, (3) collection of light by main photodiode 122 or stage photodiode 88, and (4) conversion of the electrical current signal from main photodiode output line 124 or stage photodiode output line 110 to the digital data. By building a database wherein the digital data is associated with the position of substrate 82 at each point of the raster scan, control computer 10 builds an image of substrate 82. The resolution of the image is not limited by the wavelength of light, but by the distance between measurement points, and by the size of the aperture in optical probe 74.

The image produced by NSOM lithography system 5 may be used, for example, to generate NSOM image data identifying the location of NSOM optical probe 74 with respect to features on substrate 82 (given the known positions of X and Y translation stages 64 and 62, and rotational stage 86). The NSOM image data may then be used to implement software corrections, allowing NSOM optical probe 74 to align to features on substrate 82 with high precision.

Figure 5:
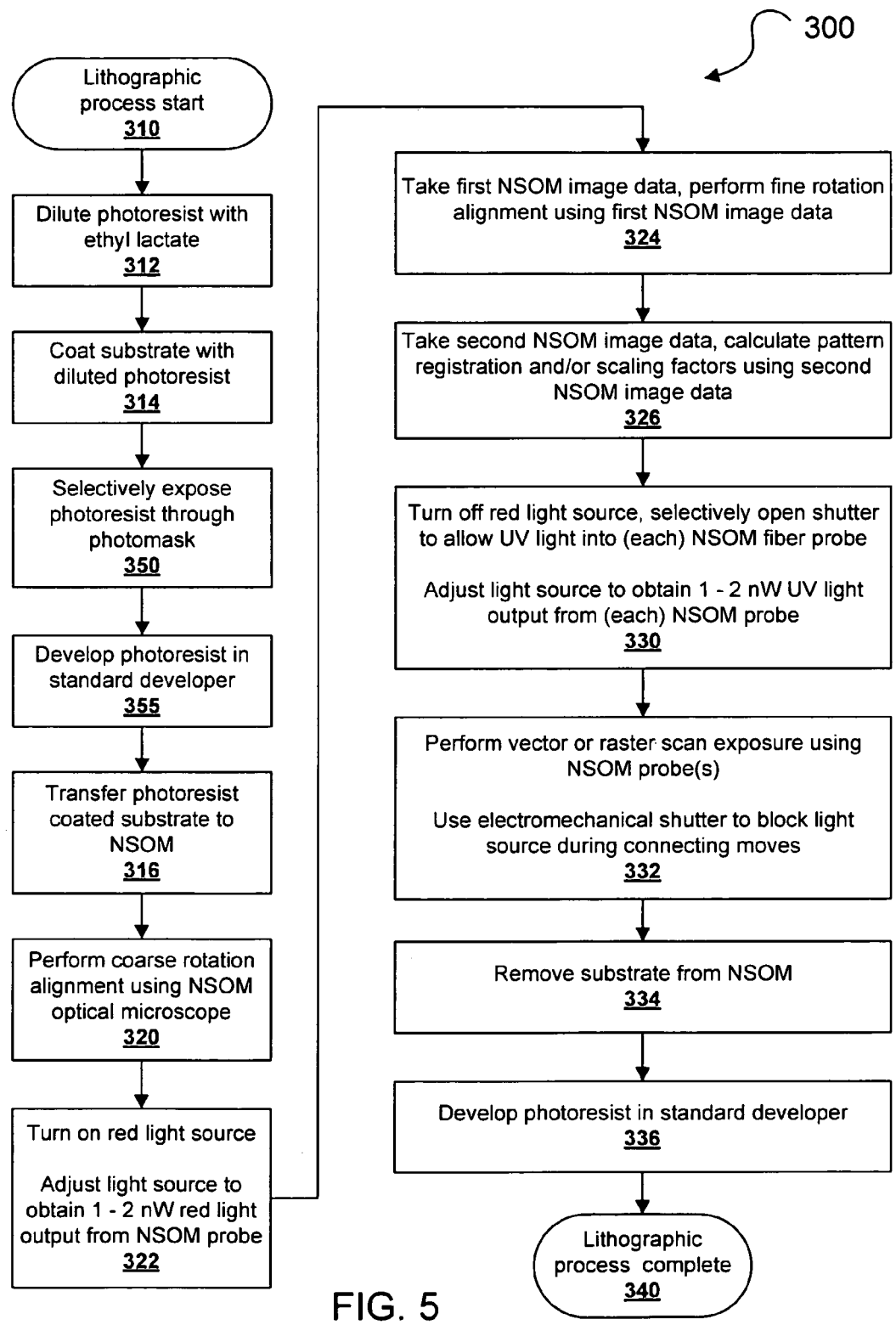
FIG. 5 is a flowchart of a lithographic process employing the NSOM lithography system of FIG. 1, to expose photoresist.

When NSOM lithography system 5 operates as a lithography exposure tool, UV light emitted through optical probe 74 exposes photoresist on substrate 82. FIG. 5 is a flowchart of a lithographic process 300 employing NSOM lithography system 5 to expose photoresist. The lithographic process begins at step 310. An optional step 312 dilutes photoresist with ethyl lactate, to enable application of the photoresist as a thin film. Step 314 applies the (optionally diluted) photoresist to a substrate (e.g., substrate 82). Steps 350 and 355 are described further below. Step 316 transfers the photoresist coated substrate to the NSOM (i.e., places it on substrate holder 80). Step 320 performs a coarse rotation alignment (e.g., using NSOM optical microscope 60). Step 322 turns on a red light source into the NSOM fiber probe for imaging during alignment (i.e., control computer 10 transmits a signal into red laser power control line 134, causing red light to be emitted into optical fiber 72, as described in FIG. 4). Step 322 also adjusts the intensity of the light obtained at the fiber tip (i.e., by evaluating the light received at photodiode assembly 88 and appropriately adjusting the signal into red laser power control line 134). Step 324 takes NSOM image data, calculates a fine rotation alignment correction based on this data, and performs a fine rotation alignment (i.e., by sending a signal into stage control line 102(*c*) to move rotational stage 86 by the amount of the correction). The use of red light at step 324 avoids exposure of photoresist as image data is taken, as photoresist is insensitive to red light. Step 326 also takes NSOM image data (again using red light) and calculates registration correction factors (i.e., pattern registration and/or image scaling factors that direct the motions of NSOM 50 during exposure). Step 330 turns off the red light (i.e., by sending appropriate signals into red laser power control line 134), and selectively opens a shutter to couple UV light into the NSOM fiber probe for photoresist exposure (i.e., by sending appropriate signals into UV laser power control line 132 and shutter control line 130, the UV light emitted being coupled into optical fiber 72, as described in FIG. 4). Step 330 also adjusts the intensity of the light obtained at the fiber tip (i.e., by evaluating the light received at photodiode assembly 88 and sending appropriate signals into UV laser power control line 132). The use of UV light enables the exposure of photoresist in step 332, described below. Steps 320, 322, 324, 326 and 330 above may be fully automated, that is, performed by control computer 10 under the control of software 20 without human intervention, or they may be performed with the assistance of a human (e.g., to perform rotation alignment step 320, to validate fine alignment step or registration step 326, and/or to adjust the light sources).

Step 332 performs vector or raster scan exposure of the photoresist. A computer (e.g., control computer 10) reduces pattern information from a pattern database to a series of lines to be exposed in the photoresist. In vector scan exposure, the lines to be exposed are referred to as vectors, and may point in any direction over the surface being imaged (i.e., when substrate 82 is an X-Y plane, any vector may have both X and Y components). Vector scan exposure is thus analogous to the operation of a pen type plotter. In raster scan exposure, the lines to be exposed are in either the X or Y direction, and the substrate being exposed is scanned past a writing tool in one of the X or Y directions before its position is incremented in the other of the X or Y directions. Raster scan exposure is thus analogous to the operation of an ink jet type printer (using a single ink jet).

In either of vector or raster scanning, the photoresist is selectively exposed through the NSOM probe. Control computer 10 coordinates operation of an electromechanical shutter (e.g., shutter 38 of FIG. 4) to block UV light during connecting moves (e.g., as optical probe 74 passes over areas wherein exposure is undesirable). Step 334 removes the exposed substrate from the NSOM (e.g., from substrate holder 80 of FIG. 3). Step 336 develops the exposed photoresist in a standard developer. Step 340 completes the lithographic process.

The high precision and long travel of X translation stage 64 and Y translation stage 62, combined with the other features of NSOM lithography tool 5, may provide advantages relative to existing direct write lithography tools. For example, tools which employ piezo members for fine positioning of substrates have a motion range of tens of microns. Larger motions involve a combination of coarse motions (provided by, for example, translation stages) and fine motions provided by the piezo members. This can lead to "stitching errors" in which large individual shapes include gaps due to a calibration mismatch between the fine and coarse movements. The use of Y and X translation stages 62 and 64 (as shown in FIG. 2 and FIG. 3) with travel limits sufficient to traverse an entire substrate 82 past an optical probe 74 in a single continuous motion, enables an NSOM 50 to expose large feature sizes without the stitching errors of the prior art. "Entire substrate," in this context, means from any given point on one of the edges of the substrate to any other point on an opposing edge of the substrate.

An advantage of NSOM lithography tool 5 relative to conventional (i.e., mask based, projection or contact) lithography tools is the ability to control the dimensions of individual exposed features by varying the scan speed during exposure. For example, when a mask based lithography tool of the prior art is used to expose photoresist, it is common practice to vary the exposure time to control the dimensions of exposed features. When positive photoresist is used, a longer exposure results in slightly wider exposed areas. However, the simultaneous exposure of all the mask features causes the dimensions of all the exposed areas to vary according to the exposure. When an application requires changes to specific dimensions within a layer (leaving other dimensions unchanged), implementing the changes requires generation of a new design database and generation of a new photomask from the new design database. Generating a photomask costs from several hundred dollars up to about three thousand dollars, and can take days or weeks. By contrast, when NSOM lithography tool 5 is used, the exposure scan speed may be varied (by control computer 10, under the control of software 20) on a feature by feature basis, with slower scan speed resulting in wider exposed areas (in positive photoresist). Thus, once a new design database is generated, the change can be tested immediately, resulting in savings of both money and time compared to the prior art.

Other advantages of NSOM lithography tool 5, relative to existing direct write lithography tools, may include the ability to image substrate features for alignment purposes, without exposing photoresist, and to avoid certain conditions that may cause substrate damage. Prior art electron beam tools cannot selectively generate an image of a substrate for alignment purposes without exposing photoresist in the imaged areas. Fiber optic subsystem 30 of NSOM lithography tool 5 is a light source that alternates between the use of red light (which does not expose photoresist) for generating data for alignment and registration purposes, and UV light for photoresist exposure. Electron beam tools also require the substrate to be subjected to a vacuum, and exposure of the substrate to beams of electrons with energy on the order of one thousand to one hundred thousand electron volts. Either of these conditions may cause damage to certain types of substrates. NSOM lithography tool 5 exposes the substrate only to atmospheric conditions and relatively low energy photons.

Figure 6:
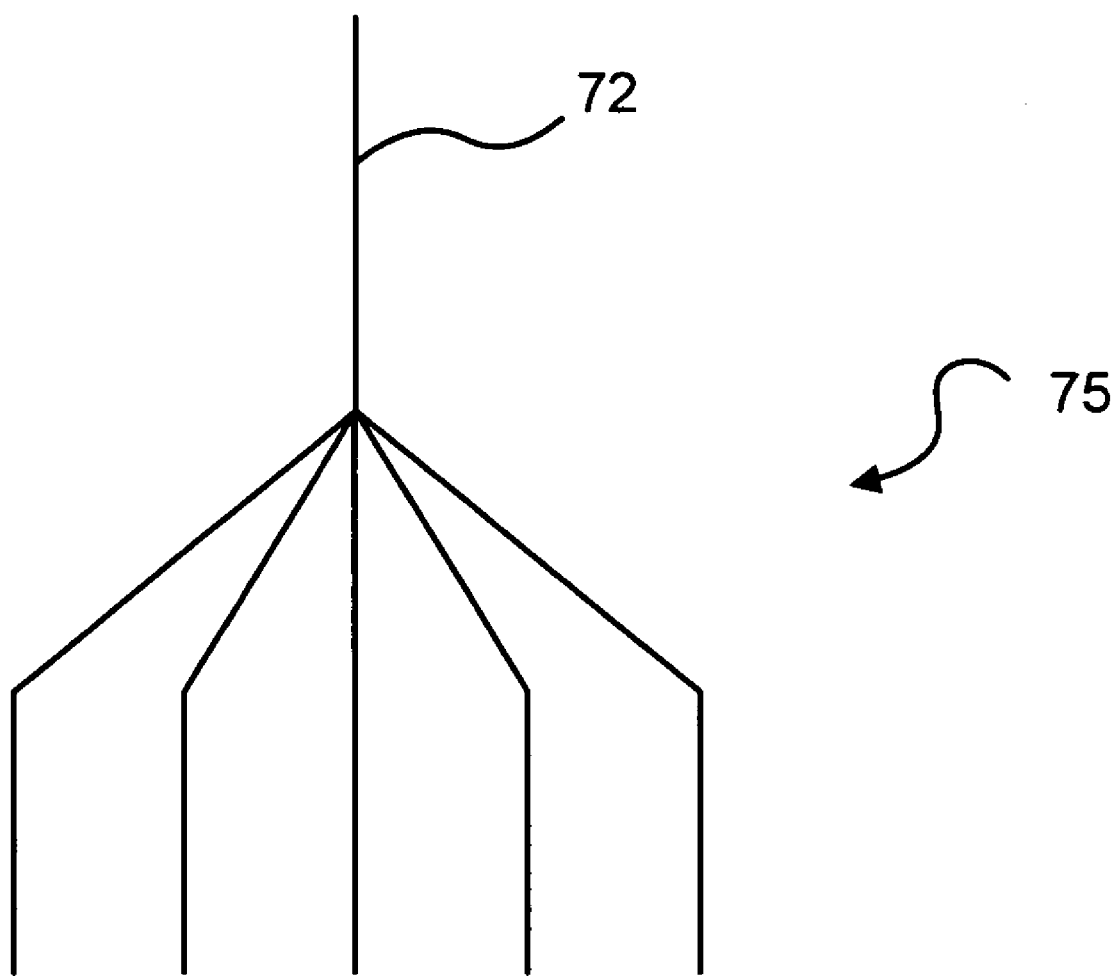
FIG. 6 is a schematic illustration of an array of NSOM probes.

In another embodiment of an NSOM lithography tool as described herein, an array of optical probes is used to simultaneously expose photoresist at multiple points on a substrate. A single probe in a probe array may be coupled alternately to red light and UV light sources to facilitate imaging for alignment and registration. Alternatively, a single probe (i.e., a probe that is not part of an array) may be coupled alternately to red light and UV light sources to facilitate imaging for alignment and registration; offsets may be implemented in software to correct for the difference in position between the single probe and the probes of a probe array. FIG. 6 is a schematic illustration of an array 75 of NSOM probes coupled with optical fiber 72. The number of probes shown in FIG. 6 is illustrative only, it will be appreciated that an array of NSOM probes may have more or fewer probes than are shown in FIG. 6.

In another exemplary use of an NSOM lithography tool as described herein, coarse features may be patterned on a substrate using a conventional lithography tool, and fine features may be written using NSOM lithography. In one embodiment, a substrate (e.g., substrate 82) may be coated with photoresist and exposed using a conventional lithography tool. In FIG. 5, after a substrate is coated with diluted photoresist in step 314, step 350 selectively exposes photoresist through a photomask using the conventional lithography tool. In step 355, the photoresist is developed to fix a first image, after which the substrate is placed on a substrate holder (e.g., substrate holder 80) in step 316. In this example, the NSOM lithography tool may align either to the developed photoresist image, or to features created on the substrate by previous process steps. After exposure in the NSOM lithography tool, the photoresist is developed again to fix a second image.

In another embodiment, a substrate (e.g., substrate 82) is coated with photoresist, and a first image is exposed using a conventional lithography tool. Subsequently, the substrate is placed on a substrate holder (e.g., substrate holder 80) without development of the photoresist. A latent photoresist image is generally present after photoresist is exposed but before it is developed. The NSOM lithography tool may align either to a latent photoresist image, or to features created on the substrate by previous process steps. After exposure of a second image by the NSOM lithography tool, the photoresist is developed to fix the first and second images simultaneously.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A near-field scanning optical microscope system, composing:
    an NSOM probe; and
    high precision translational stages for moving one of the NSOM probe and a substrate such that the NSOM probe traverses, in continuous motion, over the entire substrate.

2. The near-field scanning optical microscope system of claim 1, wherein one or more of the translational stages comprise granite air bearing stages.

3. The NSOM system of claim 2, wherein at least one of the translational stages is capable of continuous motion of at least 300 mm.

4. The NSOM system of claim 2, wherein at least one of the translational stages is capable of 2 nm step sizes.

5. The NSOM system of claim 3, wherein at least one of the translational stages is capable of 2 nm step sizes.

6. The near-field scanning optical microscope system of claim 1, further comprising a rotational stage mounted with the translational stages, for aligning axes of the substrate to axes of the translational stages.

7. The near-field scanning optical microscope system of claim 1, further comprising means for generating NSOM image data.

8. The near-field scanning optical microscope system of claim 7, wherein NSOM image data is used to calculate registration correction factors for subsequent photoresist exposure.

9. The near-field scanning optical microscope system of claim 7, further comprising a light source operable to alternate between a first wavelength of light, to generate the NSOM image data, and a second wavelength of light, to expose photoresist.

10. The near-field scanning optical microscope system of claim 1, further comprising a photodiode integrated with a substrate holder.

11. The near-field scanning optical microscope system of claim 1, wherein the NSOM probe traverses the substrate in one of a vector scan and a raster scan.

12. The NSOM system of claim 11, wherein the NSOM probe traverses the substrate in a vector scan.

13. A near-field scanning optical microscope system, comprising:
    an array of NSOM probes; and
    high precision translational stages for moving one of the array of NSOM probes and the substrate such that the array of NSOM probes traverses, in continuous motion, over the entire substrate.

14. The near-field scanning optical microscope system of claim 13, wherein one or more of the translational stages comprise granite air bearing stages.

15. The NSOM system of claim 13, wherein at least one of the translational stages is capable of continuous motion of at least 300 mm.

16. The near-field scanning optical microscope system of claim 13, further comprising a rotational stage mounted with the translational stages, for aligning axes of the substrate to axes of the translational stages.

17. The near-field scanning optical microscope system of claim 13, further comprising means for generating NSOM image data.

18. The near-field scanning optical microscope system of claim 17, wherein NSOM image data is used to calculate registration correction factors for subsequent photoresist exposure.

19. The near-field scanning optical microscope system of claim 17, further comprising a light source operable to alternate between a first wavelength of light, to generate the NSOM image data, and a second wavelength of light, to expose photoresist.

20. The near-field scanning optical microscope system of claim 13, further comprising a photodiode integrated with a substrate holder.

21. The near-field scanning optical microscope system of claim 13, wherein the array of NSOM probes traverses the substrate in one of a vector scan and a raster scan.

22. A method for exposing photoresist on a substrate, comprising:
    translating a surface of the substrate across an NSOM probe in continuous motion, translating comprising utilizing a high precision translational stages; and
    selectively exposing the photoresist through the NSOM probe during the continuous motion.

23. The method of claim 22, the step of translating comprising adjusting a speed of the substrate relative to the NSOM probe, to adjust exposure of the photoresist.

24. The method of claim 22, further comprising a step of selectively exposing the photoresist through a photomask, before the step of translating.

25. The method of claim 24, the step of translating comprising utilizing image data from a latent image of the photoresist to align the NSOM probe.

26. The method of claim 24, further comprising the step of developing the photoresist, after the step of selectively exposing the photoresist through a photomask, before the step of translating.

27. The method of claim 26, the step of translating comprising utilizing image data from a developed photoresist image to align the NSOM probe.

28. A method for exposing photoresist on a substrate, comprising:
    translating a surface of the substrate across an array of NSOM probes in continuous motion, translating comprising utilizing a high precision translational stages; and
    selectively exposing the photoresist through the array of NSOM probes during the continuous motion.

29. A software product comprising instructions, stored on computer-readable media, wherein the instructions, when executed by a computer,
    perform steps for
    generating control signals for high precision translational stages to translate a surface of a substrate across an NSOM probe in continuous motion, and
    selectively exposing photoresist through the NSOM probe during the continuous motion.

30. The software product of claim 29, wherein the Step of generating control signals comprises utilizing design database information to adjust a translational speed produced by the control signals, to adjust exposure of the photoresist.

31. The software product of claim 29, further comprising instructions, stored on computer-readable media, wherein the instructions, when executed by a computer, perform steps for
   generating NSOM image data,
   calculating at least one of pattern registration data and scaling data from the NSOM image data, and
   utilizing the at least one of pattern registration data and scaling data to generate corrections for the control signals, to align the NSOM probe to features of the substrate.

32. The software product of claim 31, wherein the step of generating NSOM image data comprises utilizing a first light source, and
   the step of selectively exposing photoresist comprises utilizing a second light source.

* * * * *